UNITED STATES PATENT OFFICE.

ROBERT B. MACDONALD, OF OAKLAND, CALIFORNIA, ASSIGNOR, BY MESNE ASSIGNMENTS, TO W. H. WINKLEY, OF LOS ANGELES, CALIFORNIA.

HEAT-INSULATING MATERIAL AND PROCESS OF MAKING THE SAME.

1,332,348. Specification of Letters Patent. Patented Mar. 2, 1920.

No Drawing. Application filed July 1, 1918. Serial No. 242,752.

*To all whom it may concern:*

Be it known that I, ROBERT B. MACDONALD, a citizen of the United States, and a resident of Oakland, county of Alameda, and State of California, have invented a certain new and useful Heat-Insulating Material and Process of Making the Same, of which the following is a specification.

The invention relates to heat insulating material composed chiefly of insulating earth such as infusorial or diatomaceous earth and to a process for manufacturing the same.

An object of the invention is to provide a molded heat insulating material formed of insulating earth which possesses heat insulating properties greater than the earth from which it is formed.

Another object of the invention is to provide a heat insulating material which may be molded or applied in plastic form and which will not check or crack upon drying or baking.

Another object of the invention is to provide a heat resistant mortar for binding together blocks of heat insulating earth or for binding the blocks to any surface.

A further object of the invention is to provide a heat insulating material formed principally of heat insulating earth which is more porous than the original earth.

The invention possesses other advantageous features, some of which, with the foregoing, will be set forth at length in the following description where I shall outline in full one form of the process of my invention.

By my invention I produce a heat insulating material of infusorial or diatomaceous earth which may be molded into any desired shape or applied in plastic form to any desired surface and which when it is dried, will not crack or check and which when dried possesses heat insulating properties greater than the original insulating earth of which it is composed.

Insulating earths contain silica which is soluble in alkali solutions, such as solutions of sodium or potassium hydroxid or carbonate, producing sodium or potassium silicates, which upon drying or hardening cements the pieces or particles of the insulating earth together. The use of the alkali solution alone will produce a heat insulating material having substantially the same heat insulating properties as the heat insulating rock from which it is made. In accordance with my invention I employ in conjunction with the alkali, an adhesive material which greatly decreases in volume upon drying and which is of a pasty nature, so that a rather large proportion of it may be mixed with the earth without making the mass too liquid for proper handling or molding. Any material and preferably colloidal material having binding or adhesive properties and which shrinks to a very great extent on drying, may be employed, and I prefer to use gelatinized starch on account of its availability and cheapness. The starch may be gelatinized by boiling it in water at which time its bulk greatly increases or it may be gelatinized by mixing it with any of the previously mentioned alkali solutions or by mixing the starch with water and an alkali. The mixture of alkali and gelatinized starch is then thoroughly mixed with the crushed, ground or finely divided insulating earth until the mass assumes a plastic form. The proportion of starch and alkali varies with conditions of the earth and other factors, but I have had excellent results with a mixture consisting of 100 parts by weight of insulating earth, approximately 3 parts of starch by weight, and one part of alkali by weight and sufficient water to make the whole mass plastic.

The material may then be placed in molds for baking or it may be applied in plastic form to steam boilers or other apparatus which it is desirable to heat insulate. When applied to steam boilers or steam pipes in the plastic condition, the material is dried out by steam at which temperature the starch is shrunken to its original volume leaving myriads of air cells, and the particles or pieces of earth are cemented together and held in place by the alkali silicate. The gelatinized starch is thoroughly disseminated throughout the mass and the great shrinkage of the starch particles on drying produces myriads of air cells, which produce a much more porous and a better heat insulating material than the original rock, the cellular structure of which assists greatly in producing the heat insulating product. When it is desirable to manufacture this material into standard or commercial shapes the plastic mixture is placed in molds and dried and hardened. When a heat resistant material is to be produced, the plastic material in the molds or the hardened shapes are baked at a temperature 300° F. or greater, causing the starch to be converted into dextrin, which carbonizes at higher temperatures, leaving the insulating earth particles or pieces cemented together by the alkali silicate. The piece, which is approximately 20% lighter than the original rock, may now be ground to exact size and shape and may be subject to direct or indirect heat up to its fusion point—about 3000° F. without unduly shrinking or cracking.

The material of my invention, when in a plastic or somewhat thinner condition, forms an excellent heat insulating mortar for permanently binding together pieces of heat insulating material or for binding the material to any surface. When the material is to be used as a mortar, it is usually mixed dry and the water is added when it is desired to make the mortar. The material on account of its great porosity may also be advantageously employed as sound insulating material.

In the manufacture of an insulating wall plaster, I may use caustic lime instead of the sodium or potassium hydroxid. In that case the caustic lime and starch are ground together and mixed with the ground dry insulating earth and then water is added. The water hydrates the lime and this chemical action will cause the gelatinizing of the starch and the formation of a calcium silicate cement which binds the earth particles together.

I claim:

1. A heat insulating material formed from a mixture composed mainly of heat insulating earth, alkali, starch and water, a portion of the alkali being combined with the insulating earth in the form of a silicate, the material having a large number of air cells formed by the drying of the starch.

2. A heat insulating material formed from a mixture composed mainly of heat insulating earth, alkali, gelatinized starch and water, a portion of the alkali being combined with the insulating earth in the form of a silicate, the material having a large number of air cells formed by the drying of the gelatinized starch particles.

3. A dry heat insulating material formed from a mixture composed mainly of heat insulating earth, alkali, water and a colloidal material which shrinks on drying, a portion of the alkali being combined with the insulating earth in the form of a silicate.

4. A dry heat insulating material composed of heat insulating earth and an alkali and having a plurality of cells therein formed by the driving off of a gelatinized starch, a portion of the alkali being combined with the heat insulating earth in the form of a silicate.

5. The method of making heat insulating material which consists in mixing heat insulating earth with an alkali and an adhesive material which shrinks on drying and sufficient water to make a plastic mixture.

6. The method of making heat insulating material which consists in mixing heat insulating earth with an alkali and a pasty material which shrinks on drying and sufficient water to make a plastic mixture and shaping and drying the mixture.

7. The method of making heat insulating material which consists in mixing heat insulating earth with an alkali, gelatinized starch, and sufficient water to make a plastic mixture and shaping and drying the mixture.

8. The method of making heat insulating material which consists in mixing heat insulating earth with an alkali, gelatinized starch and sufficient water to make a plastic mixture and shaping and baking the mixture.

9. A mixture which when mixed with water forms a plastic heat insulating material consisting mainly of a mixture of heat insulating earth, a material which when gelatinized is an adhesive which shrinks on drying and an alkali.

In testimony whereof, I have hereunto set my hand at San Francisco, California, this 11th day of June, 1918.

ROBERT B. MACDONALD.

In presence of—
  H. G. PROST.